United States Patent
Zeng

(10) Patent No.: US 8,219,858 B2
(45) Date of Patent: Jul. 10, 2012

(54) METHOD FOR TESTING HARD DISKS UNDER AN EXTENSIBLE FIRMWARE INTERFACE

(75) Inventor: Ge-Xin Zeng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 365 days.

(21) Appl. No.: 12/650,799

(22) Filed: Dec. 31, 2009

(65) Prior Publication Data

US 2011/0022901 A1 Jan. 27, 2011

(30) Foreign Application Priority Data

Jul. 22, 2009 (CN) .......................... 2009 1 0304672

(51) Int. Cl.
*G06F 11/00* (2006.01)
(52) U.S. Cl. .............................. 714/42; 714/25; 324/210
(58) Field of Classification Search .................... 714/42, 714/25; 324/210
See application file for complete search history.

(56) References Cited

U.S. PATENT DOCUMENTS

| | | | |
|---|---|---|---|
| 6,889,340 B1 * | 5/2005 | Bramley, Jr. .................. | 714/6.1 |
| 7,546,487 B2 * | 6/2009 | Marisetty et al. ............... | 714/27 |
| 2006/0107106 A1 * | 5/2006 | Michaelis et al. .............. | 714/11 |
| 2008/0074107 A1 * | 3/2008 | Fan et al. ...................... | 324/212 |
| 2008/0209100 A1 * | 8/2008 | Wang et al. ................... | 711/100 |
| 2009/0106289 A1 * | 4/2009 | Furusho ....................... | 707/102 |
| 2009/0113257 A1 * | 4/2009 | He et al. ...................... | 714/714 |

\* cited by examiner

*Primary Examiner* — Scott Baderman
*Assistant Examiner* — Loan L. T. Truong
(74) *Attorney, Agent, or Firm* — Altis Law Group, Inc.

(57) ABSTRACT

A method for testing hard disks under an extensible firmware interface (EFI) provides a device tree of hard disks. Nodes of the device tree represent block devices or file systems of the hard disks. Devices paths and handles corresponding to each of the device paths are obtained from the device tree. Parent controller handles of each of the device paths are obtained. If there are parent controller handles the same as the obtained handles, the parent controller handles the same as the obtained handles are deleted. The computer determines that a number of the hard disks is equal to a number of the device paths corresponding to the remained parent controller handles. Nodes information of each of the device paths corresponding to the remained parent controller handles are determined as hard disk information of each of the hard disks.

18 Claims, 7 Drawing Sheets

METHOD FOR TESTING HARD DISKS UNDER AN EXTENSIBLE FIRMWARE INTERFACE

BACKGROUND

1. Technical Field

Embodiments of the present disclosure relate to hard disk tests, and more particularly to a method for testing hard disks under an extensible firmware interface (EFI).

2. Description of Related Art

Reading and writing test of hard disks are implemented under an operating system. These tests need to be limited to a predetermined time. Additionally, the tests need to be run on a section of a storage device that is different from an operating system of a system.

What is needed, therefore, is an improved method for testing hard disks.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
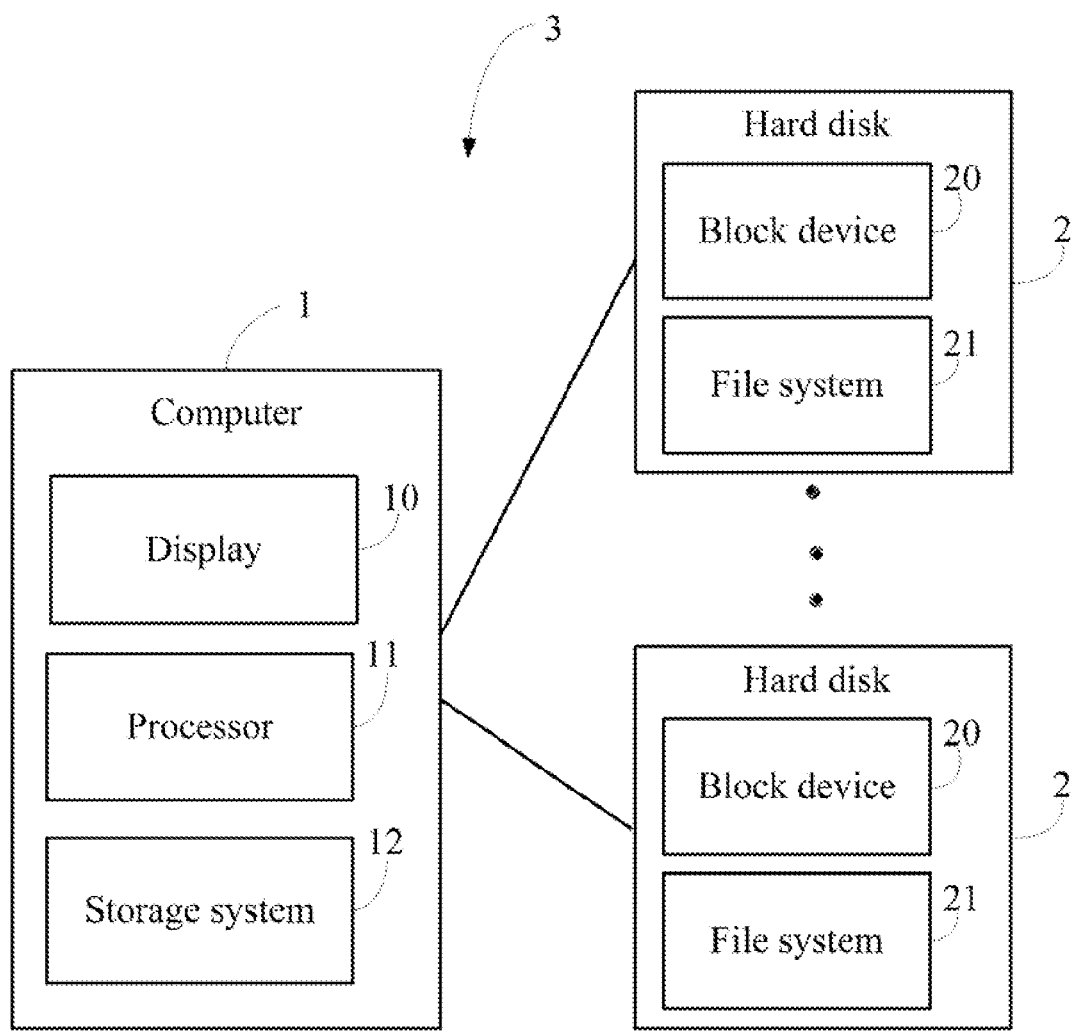
FIG. 1 is a block diagram of one embodiment of a system for testing hard disks under an extensible firmware interface.

FIG. 1 is a block diagram of one embodiment of a system 3 for testing hard disks under an extensible firmware interface (EFI). The system 3 includes a computer 1 and a plurality of hard disks 2. The computer 1 includes a display 10. The display 10 may display various visible data, such as test results, for example. Each of the plurality of hard disks 2 includes a plurality of block devices 20 and file systems 21. In one embodiment, the file system may be a file allocation table 32 (FAT 32) system and a new technology file system (NTFS), for example. The computer 1 includes a processor 11 and a storage system 12. The processor 11 executes one or more computerized operations of the computer 1 and other applications, to provide the functions of the computer 1. The storage system 12 includes a device tree 4 (shown in FIG. 2) of the hard disks 2.

Figure 2:
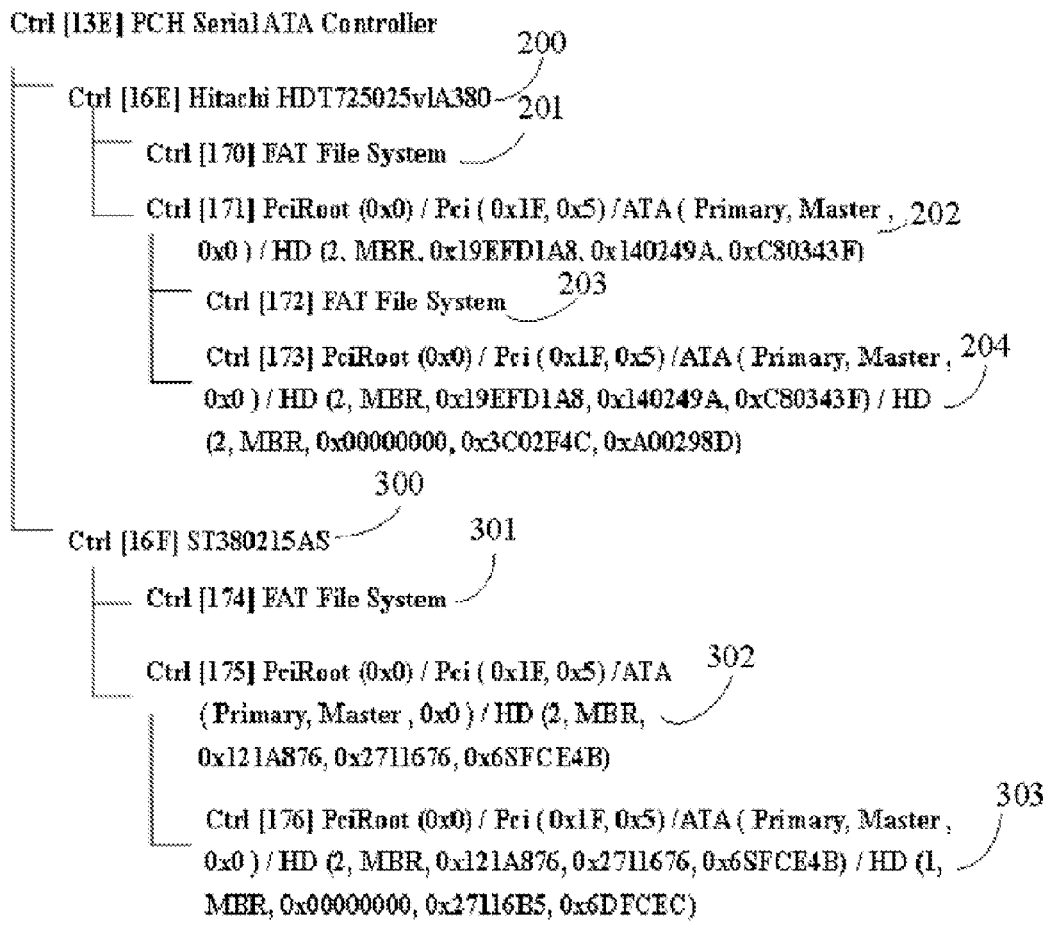
FIG. 2 is a schematic diagram illustrating one embodiment of a device tree.

FIG. 2 is a schematic diagram illustrating one embodiment of the device tree 4. Each branch of the device tree 4 may represent a hard disk 2. Nodes of each branch 4 may represent a block device 20 or a file system 21. The device path may represent a path of the block device 20 or the file system 21 of the hard disk 2. Each device path corresponds to a handle. The handle is an identifier of each device path. The device path of the hard disk 2 may include node information of the hard disk 2. In one embodiment, the hard disk information may include, but are not limited to, a hard disk manufacturer, a hard disk capacity, and an interface type of the hard disk 2. In one embodiment, the icon 201 in FIG. 2 indicates the node information of "[170] FAT File System." The "FAT File System" is the device path. The "170" is the handle corresponding to the device path. In another embodiment, the icon 202 indicates the node information of "[171] PciRoot (0x0)/Pci (0x1F, 0x5)/ATA (Primary, Master, 0x0)/HD (2, MBR, 0x19EFD1A8, 0x140249A, 0xC80343F)." The "PciRoot (0x0)/Pci (0x1F, 0x5)/ATA (Primary, Master, 0x0)/HD (2, MBR, 0x19EFD1A8, 0x140249A, 0xC80343F)" is the device path. The "171" is the handle of the device path.

Figure 3:
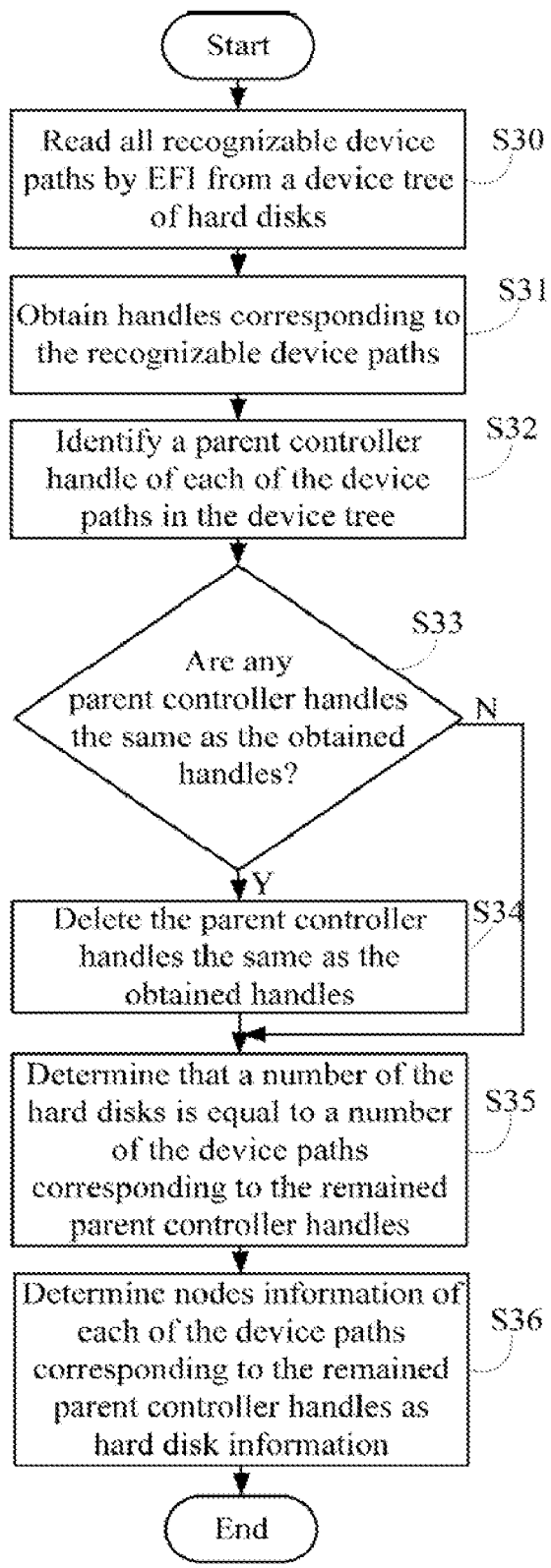
FIG. 3 is a flowchart of one embodiment of a method for testing hard disks under an extensible firmware interface.

FIG. 3 is a flowchart of one embodiment of a method for testing hard disks 2 under the EFI using the system 3 of FIG. 1. Depending on the embodiment, additional steps may be added, others removed, and the ordering of the blocks may be changed.

In step S30, the computer 1 reads all recognizable device paths by the EFI from the device tree 4 of the hard disks 2. As shown in FIG. 2, the device paths indicated by the icons of "201," "202," "203," "204," "301," "302," and "303" may be recognizable by the EFI.

In step S31, the handles corresponding to the recognizable device paths are obtained. In one embodiment, the handles "[170]," "[171]," "[172]," "[173]," "[174]," "[175]" and "[176]" may be obtained.

In step S32, the computer 1 identifies a parent controller handle of each of the recognizable device paths in the device tree 4. In one embodiment, the parent controller handle is a handle of a parent node of the device path in the device tree 4. For example, the parent controller handle of the device path indicated by the icon "203" is "171." The parent controller handle of the device path indicated by the icon "303" is "175."

In step S33, the computer 1 detects if there are parent controller handles the same as the obtained handles. If no parent controller handle is the same as the obtained handles, the procedure goes to step S35 directly.

If there are parent controller handles the same as the obtained handles, in step S34, the parent controller handles the same as the obtained handles are deleted, and step S35 is implemented.

In step S35, the computer 1 determines that a number of the hard disks 2 is equal to a number of the device paths corresponding to the remained parent controller handles.

In step S36, the computer 1 obtains the node information of each of the device paths corresponding to the remained parent controller handles, and determines that the obtained node information is hard disk information of each of the hard disks 2. In one embodiment, the hard disk information may include a manufacturer name, a capability of the hard disk, and an interface type of each hard disk 2.

Figure 4:
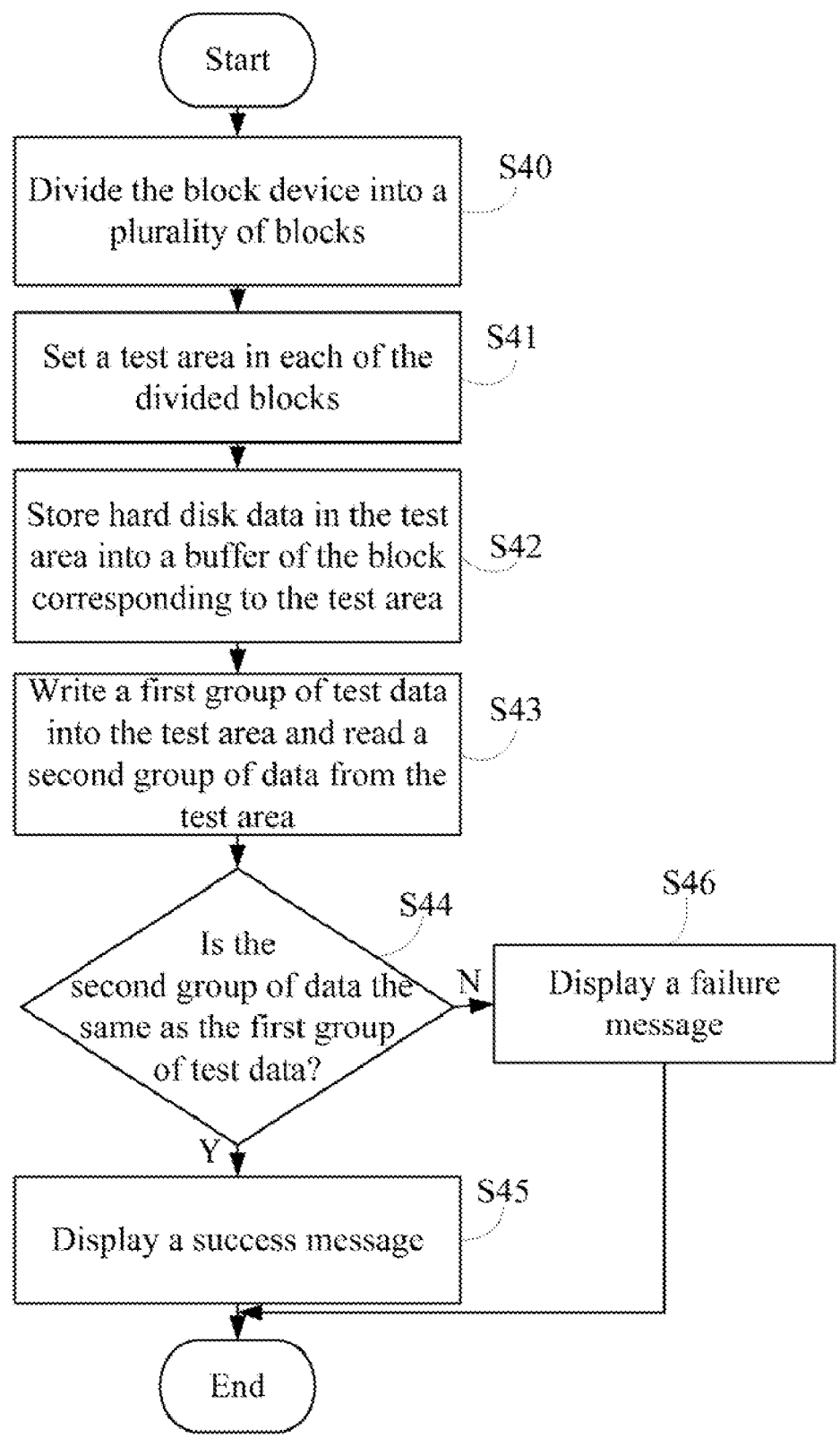
FIG. 4 is a flowchart of one embodiment of a method for testing a writing function and/or reading function of block devices of hard disks under an extensible firmware interface.

FIG. 4 is a flowchart of one embodiment of a method for testing a read function and write function of the block devices 20 of the hard disks 2 under the EFI. Depending on the embodiment, additional steps may be added, others removed, and the ordering of the steps may be changed.

Figure 6:
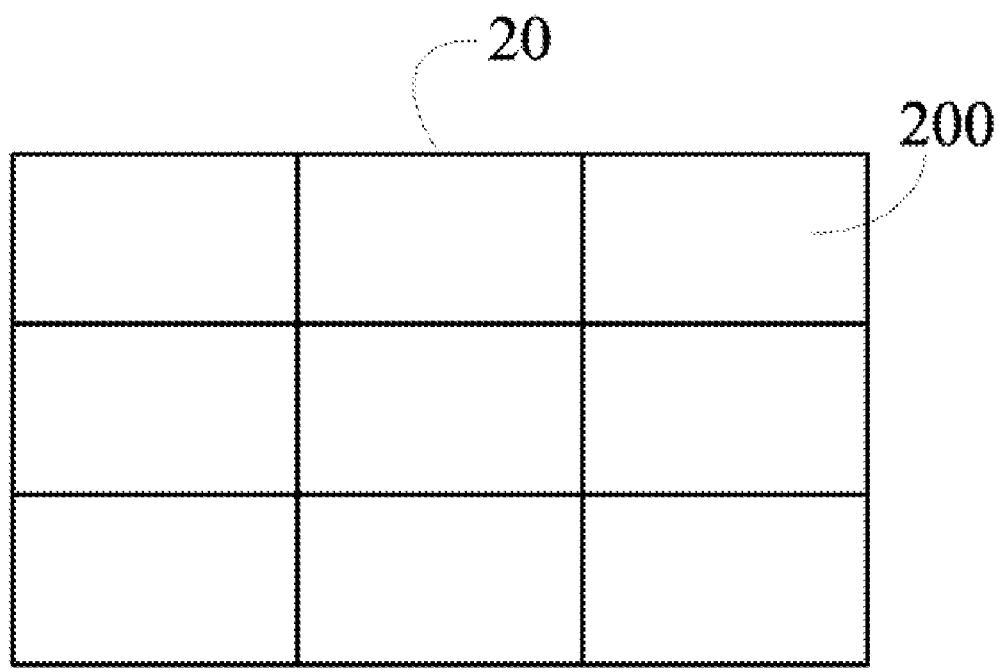
FIG. 6 is a schematic diagram illustrating one embodiment of a block device being divided into blocks.

In step S40, the computer 1 divides the block device 20 into a plurality of blocks 200. As shown in FIG. 6, the block device 20 is divided into 9 blocks 200. The number of the divided blocks 200 may be set by a user. In one embodiment, the read function test and write function test of all the divided blocks 200 may be implemented at the same time or according to a predetermined order. The predetermined order may be set according to test requirements. The size of each divided block 200 is a multiple of 512 bytes. For example, if the size of each of the block devices 20 is "TotalSize" (MB) and the block device 20 is divided into "N" pieces of blocks 200, the size of each block 200 is "TotalSize*1024*1024/N" bytes.

Figure 7:
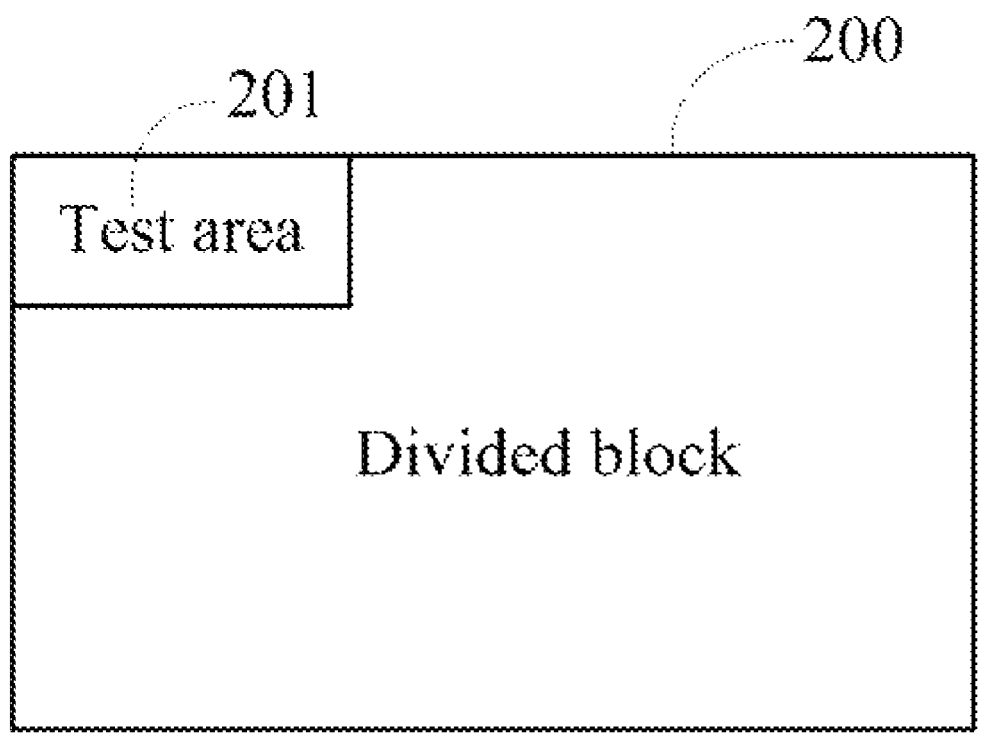
FIG. 7 is a schematic diagram illustrating one embodiment of a test area being set in a divided block.

In step S41, the computer 1 sets a test area 201 in one of the plurality of divided blocks 200, as shown in FIG. 7.

In step S42, the computer 1 stores hard disk data in the test area 201 into a buffer of the divided block 200 corresponding to the test area 201.

In step S43, the computer 1 writes a first group of test data into the test area 201 of the divided block 200 and read a second group of data from the test area 201.

In step S44, the computer 1 detects if the second group of data is the same as the first group of test data. If the second group of data is different from the first group of test data, the procedure goes to step S46.

If the second group of data is the same as the first group of test data, in step S45, the computer 1 displays a success message indicating the read function and write function of the divided block 200 is normal on the display 10, and stores the hard disk data in the buffer of the divided block 200 into the test area 201.

In step S46, the computer 1 displays a failure message indicating that the read function and write function of the divided block 200 is bad on the display 10.

Figure 5:
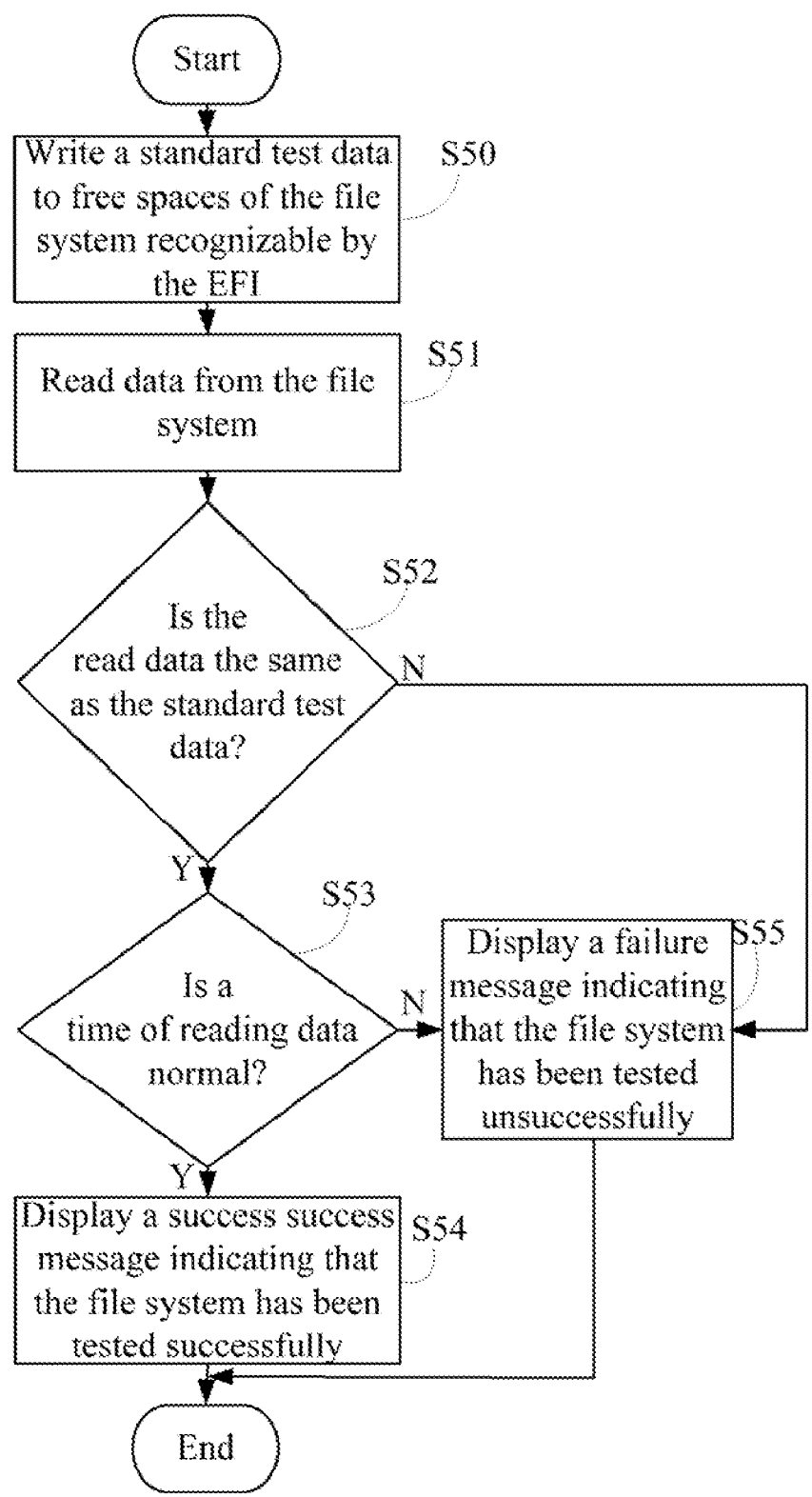
FIG. 5 is a flowchart of one embodiment of a method for testing a writing functions and/or reading functions of file systems of hard disks under an extensible firmware interface.

FIG. 5 is a flowchart of one embodiment of a method for testing read function and write function of the file systems 21 of the hard disks 2 under the EFI. Depending on the embodiment, additional blocks may be added, others removed, and the ordering of the blocks may be changed.

In step S50, the computer 1 writes a standard test data to free space of the file system recognizable by the EFI. In one embodiment, the standard test data may be written repeatedly to fill up each file system. The standard test file includes test contents and attributes of the standard test file. In one embodiment, the attributes of the standard test file may include size of the standard test file, a standard time of writing the standard test data under the EFI, for example.

In step S51, the computer 1 reads data from the file system 21. In one embodiment, the read data may include whole contents of the test contents or portions of the test contents.

In step S52, the computer 1 detects if the read data of the file system 21 is the same as the standard test data. If the read data is different from the standard test data, step S55 is implemented.

If the read data is the same as the standard test data, in step S53, the computer 1 detects if a read time of reading data is normal according to the standard time. If the read time is normal, step S54 is implemented. If the read time is abnormal, step S55 is implemented. In one embodiment, if there are any mistakes of the reading function or the writing function of the file system 21, the read time of reading data may be delayed.

In step S54, the display 10 displays a success message indicating that the file system 21 has been tested successfully.

In step S55, the display 10 displays a failure message indicating that the file system 21 has been tested unsuccessfully.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for testing hard disks under an extensible firmware interface (EFI), comprising:
   (a) using a device tree of the hard disks to read all recognizable device paths by the EFI;
   (b) obtaining handles corresponding to the recognizable device paths;
   (c) identifying a parent controller handle of each of the recognizable device paths in the device tree;
   (d) detecting if there are parent controller handles the same as the obtained handles, implementing step (e) if there are parent controller handles the same as the obtained handles, or implementing step (f) if no parent controller handle is the same as the obtained handles;
   (e) deleting parent controller handles the same as the obtained handles, and implementing step (f);
   (f) determining that a number of the hard disks is equal to a number of the device paths corresponding to the remained parent controller handles; and
   (g) obtaining node information of each of the device paths corresponding to the remained parent controller handles, and determining that the obtained node information is hard disk information of each of the hard disks.

2. The method of claim 1, wherein the hard disk information comprises a hard disk manufacturer, a hard disk capacity, and an interface type of each hard disk.

3. The method of claim 1, wherein each node of the device tree represents a block device or a file system.

4. The method of claim 3, further comprising:
   testing a read function and write function of the block device.

5. The method of claim 4, wherein the step of testing a read function and write function of the block device comprises:
   dividing the block device into a plurality of blocks;
   setting a test area in one of the plurality of divided blocks;
   storing hard disk data in the test area into a buffer of the divided block corresponding to the test area;
   writing a first group of test data into the test area of the divided block;
   reading a second group of data from the test area;
   detecting if the second group of data is the same as the first group of test data;
   displaying a success message indicating that the read function and write function of the divided block is normal on a display of the computer if the second group of data of the divided block is the same as the first group of test data; or
   displaying a failure message indicating that the read function and write function of the divided block is bad on the display if the second group of data of the divided block is different from the first group of test data; and
   storing the hard disk data in the buffer of the divided block into the test area.

6. The method of claim 5, wherein a size of each of the plurality of divided blocks is a multiple of 512 bytes.

7. The method of claim 3, further comprising:
   testing a read function and write function of the file system.

8. The method of claim 7, wherein the step of testing a read function and write function of the file system comprises:
   (a1) writing a standard test data to free spaces of the file system recognizable by the EFI, the standard test data comprising a standard time of writing the standard test file under the EFI;
   (b1) reading data from the file system;
   (c1) detecting if the read data of the file system is the same as the standard test data, implementing step (d1) if the read data is the same as the standard test data, and implementing step (f1) if the read data is different from the standard test data;

(d1) detecting if a read time of reading data from the file system is normal according to the standard time, implementing step (e1) if the read time of reading data is normal, and implementing step (f1) if the read time of reading data is abnormal;

(e1) displaying a success message indicating that the file system has been tested successfully on a display of the computer; and (f1) displaying a failure message indicating that the file system has been tested unsuccessfully.

9. The method of claim 8, wherein step (d1) comprises:

detecting if the read time of reading data is the same as the standard time;

determining that the read time of reading data is normal if the read time of reading files is the same as the standard time; and determining that the read time of reading data is abnormal if the read time of reading data is different from the standard time.

10. A non transitory medium having stored therein instructions that, when executed by a computer, cause the computer to perform a method for testing hard disks under an extensible firmware interface (EFI) comprising:

(a) using a device tree of the hard disks to read all recognizable device paths by the EFI;

(b) obtaining handles corresponding to the recognizable device paths;

(c) identifying a parent controller handle of each of the recognizable device paths in the device tree;

(d) detecting if there are parent controller handles the same as the obtained handles, implementing step (e) if there are parent controller handles the same as the obtained handles, or implementing step (f) if no parent controller handle is the same as the obtained handles;

(e) deleting parent controller handles the same as the obtained handles, and implementing step (f);

(f) determining that a number of the hard disks is equal to a number of the device paths corresponding to the remained parent controller handles; and (g) obtaining node information of each of the device paths corresponding to the remained parent controller handles, and determining that the obtained node information is hard disk information of each of the hard disks.

11. The non transitory medium of claim 10, wherein the hard disk information comprises a hard disk manufacturer, a hard disk capacity, and an interface type of each hard disk.

12. The non transitory medium of claim 10, wherein each node of the device tree represents a block device or a file system.

13. The non transitory medium of claim 12, further comprising: testing a read function and write function of the block device.

14. The non transitory medium of claim 13, wherein the step of testing a read function and write function of the block device comprises:

dividing the block device into a plurality of blocks;

setting a test area in one of the plurality of divided blocks;

storing hard disk data in the test area into a buffer of the divided block corresponding to the test area;

writing a first group of test data into the test area of the divided block;

reading a second group of data from the test area;

detecting if the second group of data is the same as the first group of test data;

displaying a success message indicating that the read function and write function of the divided block is normal on a display of the computer if the second group of data of the divided block is the same as the first group of test data; or displaying a failure message indicating that the read function and write function of the divided block is bad on the display if the second group of data of the divided block is different from the first group of test data; and storing the hard disk data in the buffer of the divided block into the test area.

15. The non transitory medium of claim 14, wherein a size of each of the plurality of divided blocks is a multiple of 512 bytes.

16. The non transitory medium of claim 10, further comprising: testing a read function and write function of the file system.

17. The non transitory medium of claim 16, wherein the step of testing a read function and write function of the file system comprises:

(a1) writing a standard test data to free spaces of the file system recognizable by the EFI, the standard test data comprising a standard time of writing the standard test file under the EFI;

(b1) reading data from the file system;

(c1) detecting if the read data of the file system is the same as the standard test data, implementing step (d1) if the read data is the same as the standard test data, and implementing step (f1) if the read data is different from the standard test data;

(d1) detecting if a read time of reading data from the file system is normal according to the standard time, implementing step (e1) if the read time of reading data is normal, and implementing step (f1) if the read time of reading data is abnormal;

(e1) displaying a success message indicating that the file system has been tested successfully on a display of the computer; and (f1) displaying a failure message indicating that the file system has been tested unsuccessfully.

18. The non transitory medium of claim 17, wherein step (d1) comprises:

detecting if the read time of reading data is the same as the standard time;

determining that the read time of reading data is normal if the read time of reading files is the same as the standard time; and determining that the read time of reading data is abnormal if the read time of reading data is different from the standard time.

* * * * *